United States Patent
Dasdan

(10) Patent No.: US 12,386,484 B2
(45) Date of Patent: Aug. 12, 2025

(54) SYSTEMS AND METHODS FOR SELECTING AND PERFORMING BULK ACTIONS ON A SET OF OBJECTS

(71) Applicants: Atlassian Pty Ltd., Sydney (AU); Atlassian US, Inc., San Francisco, CA (US)

(72) Inventor: Ali Dasdan, Mountain View, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 46 days.

(21) Appl. No.: 18/372,643

(22) Filed: Sep. 25, 2023

(65) Prior Publication Data

US 2024/0012539 A1  Jan. 11, 2024

Related U.S. Application Data

(63) Continuation of application No. 17/218,977, filed on Mar. 31, 2021, now Pat. No. 11,768,584.

(51) Int. Cl.

| | | |
|---|---|---|
| *G06F 3/0482* | (2013.01) | |
| *G06F 3/0483* | (2013.01) | |
| *G06F 16/955* | (2019.01) | |
| *H04L 67/06* | (2022.01) | |

(52) U.S. Cl.
CPC .......... *G06F 3/0482* (2013.01); *G06F 3/0483* (2013.01); *G06F 16/9558* (2019.01); *H04L 67/06* (2013.01)

(58) Field of Classification Search
CPC .............................. G06F 16/9558; H04L 67/06
See application file for complete search history.

(56) References Cited

U.S. PATENT DOCUMENTS

| | | | |
|---|---|---|---|
| 8,510,454 B2 | 8/2013 | Armstrong et al. | |
| 2002/0198963 A1* | 12/2002 | Wu | H04L 67/62 709/219 |
| 2014/0222384 A1* | 8/2014 | Nordmark | G06F 30/23 703/1 |
| 2014/0337071 A1* | 11/2014 | Stiffler | G06F 3/04847 705/7.13 |
| 2016/0239777 A1 | 8/2016 | Lassau et al. | |
| 2017/0046374 A1 | 2/2017 | Fletcher et al. | |

(Continued)

OTHER PUBLICATIONS

Author Unknown, "Bulk URL Opener," https://chrome.google.com/webstore/detail/bulk-url-opener/pkniccgephlicnahemifefnbifiglegd?hi=en, 1 page, Apr. 21, 2017.

(Continued)

*Primary Examiner* — Andrea C Leggett
(74) *Attorney, Agent, or Firm* — Brownstein Hyatt Farber Schreck, LLP

(57) ABSTRACT

Systems and methods for performing bulk actions on multiple graphical objects are described herein. The presently disclosed systems and methods may provide a client interface which may allow a user to select multiple objects and a bulk action interface which may allow a user to select one or more bulk actions that may be applied to issues associated with the previously selected multiple objects. In response to a selection of the one or more bulk actions, the systems and methods disclosed may cause the selected one or more bulk actions to be performed with respect to each of the selected multiple objects.

20 Claims, 8 Drawing Sheets

(56) References Cited

U.S. PATENT DOCUMENTS

2018/0005286 A1    1/2018  Grabarnik et al.
2020/0005538 A1*  1/2020  Neeter ................ H04L 65/4015

OTHER PUBLICATIONS

Author Unknown, "Bulk URL Opener," http:/www.visiospark.com/multiple-uri-opener/ 4 pages, at least as early as Mar. 2021.
Gremper, Fabian, "Batch Link Downloader," https://chrome.google.com/webstore/detail/batch-link-downloader/aiahkbnnpafepcgnhhecilboebmmolnn, 1 page, May 20, 2020.

* cited by examiner

AVAILABLE BULK ACTIONS ~518

520 {
- ☒ Open all tickets
- ☐ Open all tickets in browser
- ☒ Log issues
- ☐ Close issues
- ☒ Update Status: In Progress
- ☐ Update Status: Complete

SUBMIT ~522

*FIG. 5*

BULK ACTIONS TO BE PERFORMED ON: ~624

626 {
- ☒ T-01
- ☒ T-02
- ☒ T-03
- ☒ T-04
- ☒ T-05

628~ SELECT ALL | DESELECT ALL ~630

702 — ≡ SPACES▼ PROJECTS▼ ISSUES▼ PEOPLE▼ • • •

704, 708

ISSUES ASSIGNED TO ME

| STATUS | TICKET | ISSUE |
|---|---|---|
| IP | T-01 | Add video chat |
| IP | T-02 | Fix bug in browser |
| IP | T-03 | Fix audio bug |
| IP | T-04 | Create Presentation Assets |
| I | T-05 | Assign team member |
|  | T-06 | Notify Kate |

740a — T-01 — *ADD VIDEO CHAT*
▽ DETAILS
Priority: -Medium
Labels: [Video]
Status: In Progress
▽ DESCRIPTION
Users would like chat functionality tied...

740c — T-03 — *FIX AUDIO BUG*
▽ DETAILS
Priority: -High
Labels: [Bug]
Status: In Progress
▽ DESCRIPTION
Users have been reporting volume spike 740e — T-05 — *ASSIGN TEAM MEMBER*
▽ DETAILS
Priority: -Medium
Labels: [Staffing]
Status: In Progress
▽ DESCRIPTION
Project Apollo needs a coder 740b — T-02 — *FIX BUG IN BROWSER*
▽ DETAILS
Priority: -High
Labels: [Bug]
Status: In Progress 740d — T-04 — *CREATE PRESENTION ASSETS*
▽ DETAILS
Priority: -Low
Labels: [Pres]
Status: In Progress

742 — ISSUE LOG

| TICKET | ISSUE | DATE/TIME |
|---|---|---|
| T-01 | Add video chat | 02/17/20 11:00 |
| T-02 | Fix bug in browser | 02/17/20 11:00 |

*FIG. 7*

SYSTEMS AND METHODS FOR SELECTING AND PERFORMING BULK ACTIONS ON A SET OF OBJECTS

CROSS-REFERENCE TO RELATED APPLICATION(S)

This application is a continuation patent application of U.S. patent application Ser. No. 17/218,977, filed Mar. 31, 2021 and titled "Systems and Methods for Selecting and Performing Bulk Actions on a Set of Objects," the disclosure of which is hereby incorporated herein by reference in its entirety.

TECHNICAL FIELD

Embodiments described herein relate to automated techniques for performing actions on displayed objects and, in particular, selection of multiple objects and performing bulk actions with respect to the multiple objects as displayed on a graphical user interface.

BACKGROUND

An organization or individual can utilize a system to document, monitor, and/or manage a number of different projects and/or issues. In some cases, such a system may include graphical objects that correspond to issues or tickets associated with a bug or issue for a software project. In some cases, the graphical object is selectable, which may take the user to a specified target destination or source and may enable further operations or actions. One problem with traditional user interfaces is that performing a series of actions on a set of displayed graphical objects requires a large number of user inputs and interactions, which can be inefficient and time consuming.

SUMMARY

According to aspects of the present disclosure, a system comprising an issue tracking system operably couple, by a network, to a client application of a client device may be provided. The issue tracking system may be configured to receive, from the client application, a selection area including a set of objects displayed on the client device. The selection area may correspond to at least a portion of a graphical user interface displayed on the client device. The issue tracking system may be further configured to analyze each object of the set of objects within the selection area to identify a respective source associated with each object of the set of objects. In accordance with an identified source of a subset of the set of objects being the issue tracking system, the issue tracking system may be further configured to generate a set of actions corresponding to issue modification commands. The issue tracking system may further be configured to cause display of, on the client device, an available bulk action menu displaying the set of actions. Each action of the set of actions may be associated with a respective selectable selection indicator. The issue tracking system may further be configured to receive, from the client device and through the respective selectable selection indicator of each action of the set of actions, a selection of a subset of the set of actions displayed in the available bulk action menu and, in response to receiving the selection, cause the issue tracking system to perform the subset of the set of actions with respect to the subset of the set of objects.

In some embodiments, the subset of the set of objects included in the selection area may be a first subset of the set of objects, the identified source may be a first identified source, and, in accordance with a second identified source of a second subset of the set of objects being different from the first identified source, the subset of the set of actions may not be performed with respect to the second subset of the set of objects.

In some embodiments, the subset of the set of objects may correspond to issues tracked by the issue tracking system and the identified source associated with each object of the subset of the set of objects may be identified by determining a common property of the subset of the set of objects, the common property indicating that each object of the subset of the set of objects correspond to the issues tracked by the issue tracking system.

In some embodiments, the subset of actions may include updating a status associated with the issues corresponding to the subset of the set of objects. In some embodiments, the selection area may select the set of objects by forming a geometric shape around the set of objects, identifying the set of objects within the geometric shape, and receiving the identified set of objects at the issue tracking system.

In some embodiments, the subset of actions may include downloading content corresponding to each object of the subset of the set of objects from at least one of the issue tracking system or a data repository associated with the issue tracking system.

In some embodiments, the issue tracking system may be further configured to determine an amount of the content to be downloaded from the at least one of the issue tracking system or the data repository associated with the issue tracking system, based on the amount of the content, determine whether to download the content corresponding to each object of the subset of the set of objects simultaneously, and, based on determining not to download the content corresponding to each object of the subset of the set of objects simultaneously, cause display of a scheduler for scheduling a rate at which the content is downloaded on the client device. In some cases, the subset of actions may be performed simultaneously with respect to the issue tracking system.

According to aspects of the present disclosure, a method for performing bulk actions on multiple objects may be provided. The method may comprise receiving a selection area including a set of objects, analyzing each object of the set of objects within the selection area to identify a source, based on the identified source, determining a set of actions that may be performed with respect to the set of objects, the set of actions being generic to the set of objects, receiving a user input of a subset of the set of actions, and, in response to receiving the user input, causing performance of processes corresponding to the subset of the set of actions with respect to the set of objects.

In some embodiments, the method may further comprise, in response to determining the set of actions, causing display of an available bulk action menu, the available bulk action menu including each of the set of actions that may be performed with respect to the set of objects. In some cases, the user input may correspond to a selection of a subset of the set of actions included on the available bulk action menu.

In some embodiments, the method may further comprise, in response to receiving the user input from the available bulk action menu, causing display of an object selection menu, the object selection menu including each object of the set of objects and selectable graphical element for each object of the set of objects.

In some embodiments, each object of the set of objects may include a respective link and at least one of the subset of the set of actions may be an action that downloads information associated with each respective link.

In some embodiments, the method may further comprise, in response to receiving the user input, downloading the information associated with each respective link simultaneously.

In some cases, causing performance of processes corresponding to the subset of the set of actions may comprise updating a status associated with each object of the set of objects. In some cases, causing performance of processes corresponding to the subset of the set of actions may comprise opening each object of the set of objects in a respective window or tab.

According to aspects of the present disclosure, a system may be provided for performing bulk actions. The system may comprise causing display of a graphical user interface, the graphical user interface including a set of objects. The system may further comprise receiving, via a client device, a selection area of a subset of the set of objects, identifying a set of actions that may be performed with respect to the subset of the set of objects, receiving, via the client device, a user input selecting a subset of the set of actions, and, in response to receiving the user input, causing performance of the subset of the set of actions on each object of the subset of the set of objects.

In some embodiments, the system may be a collaboration system. In some embodiments, the system may be a web browser system, the set of objects may comprise respective links to respective webpages and the subset of the set of actions may include opening each respective webpage, as indicated by each respective link, in at least one of a respective tab, a respective page, or a respective window.

In some embodiments, the system may be an issue tracking system and the subset of the set of objects may be a set of tickets referencing issues tracked by the issue tracking system. In some cases, the subset of the set of actions may include updating a status associated with each ticket of the set of tickets.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIG. 5 depicts an example menu with potential bulk actions that a system may perform on a selected set of objects, such as described herein.

FIG. 6 depicts an example menu displaying a set of objects on which bulk actions are performed, such as described herein.

FIG. 7 depicts an example user interface after a number of bulk actions have been performed on a selected set of objects, such as described herein.

The use of the same or similar reference numerals in different figures is used to indicate, where practicable, similar, related, or identical items.

Figure 1:
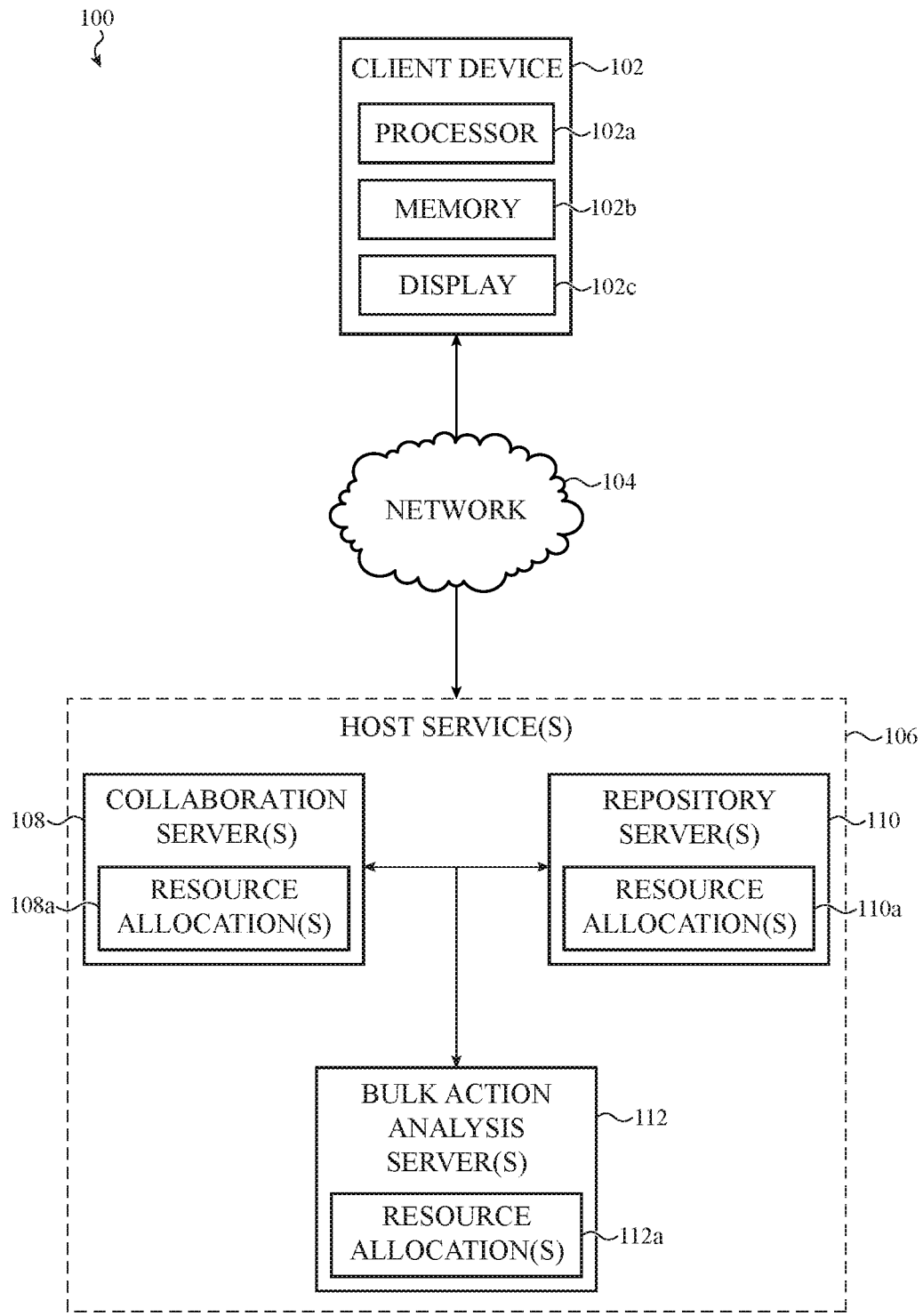
FIG. 1 is a schematic representation of a system including a bulk action analysis tool, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The techniques and systems described herein provide a tool for performing a series of actions in an automated fashion on a set of objects that are displayed in a graphical user interface. Generally speaking, a user may interact with the set of objects to perform a variety of tasks with respect to, for example, issues associated with the set of objects. For example, a user may click a particular object, which may reference an issue, to view additional information concerning the issue such as an associated description, associated people and/or team members, associated labels, an associated assignment status, an associated deadline, and so on. In some cases, a user may interact with, or click on, an object, such as a link or a representation of a file, to open a document, travel to a webpage, and/or open an application. However, in some cases, a user may only be able to interact with one object at a time. For example, if a user desires to interact with multiple objects, so as to affect a status of issues associated with the multiple objects or open a source associated with the multiple objects, the user may be required to interact with each object individually. Systems and methods described herein can be used to automate the application of a set of actions or processes to be performed on a set of displayed objects.

In particular, embodiments described herein relate to systems and methods for selecting a set of objects that relate to one or more items of a collaboration system and performing bulk actions on the selected set of objects. As described herein, various examples include selecting a set of objects, identifying a source and/or target associated with each object of the selected set of objects, identifying a set of actions that may be performed with respect to each object of the selected set of objects, based on the identified source and/or target, and, in response, performing bulk actions with respect to each object of the selected set of objects. As used herein, "bulk actions" may refer to actions that are performed with respect to more than one object without the manual selection of each object individually. In some cases, a source or target is associated with a particular platform or service, which may provide for a number of bulk actions, which may be performed on the selected objects. Specifically, objects that are determined to be associated with a common platform may, in some instances, be subject to a set of common actions, which may be performed in accordance with the embodiments described herein.

Various systems or tools, may include collaboration systems, such as issue tracking systems, project management systems, messaging/communication systems, docket management systems, any combination thereof, and so on, and other any other system such as a web browsing system. As used herein, a collaboration system may refer to any system that allows for the sharing and/or storing of information, such as documents and references to documents, to specific teams and/or members. In some cases, collaboration systems may additionally include the functionality of creating, editing, and deleting information.

Such systems may include a number of links, interactable objects, and/or data items which may be clicked, or otherwise acted upon, to perform one or a number of different functions with respect to an underlying source and/or target. In a non-limiting example, an issue tracking system may include a ticket or issue referencing a tracked software error ("bug"), software update, or other software-related issue. As used herein, a "ticket" may refer to a representation of a work item (e.g., "issue") that needs to be addressed. A ticket may include information such as a current status, users assigned to the ticket, a bug category, one or more deadlines, an associated description, security information, and so on. This information may be referenced generally as "ticket details."

Continuing the above example, when a user of the issue tracking system interacts with (e.g., via an input/output device such as a mouse) an object associated with the ticket, such as a link, various actions may be performed including providing an expanded view of the ticket details, displaying a menu including different actions which may be performed, updating a status of the ticket, initiating a ticket assignment process, and so on.

In some systems, multiple objects may be provided in a single interface, system, view, and/or graphical user interface. If a user of the system desires to interact with the multiple objects, as discussed above, the user may be required to individually interact with each particular object. In an example of the above-mentioned systems, a user may wish to change a current status of eight different tickets (e.g., update a status from "In Progress" to "Complete"). Using a traditional interface, the user may be required to click on, or otherwise interact with, each of objects representing the eight tickets individually and manually update a status of an individual ticket, via an associated object, before moving onto the next ticket. In such an example, the user may be expected to perform many identical actions, repeated with respect to each individual ticket. This repeated process may be inefficient in the number of user interactions and may also lead to processing inefficiencies as multiple discrete processes are initiated through the series of user interactions.

In another example, a collaboration system may include a page about a project status or team-specific update (e.g., as in a wiki). Such a page may include a number of different links which may, for example, open a separate tab or window with content corresponding to a source and/or a target to which the links are directed. In some systems, if a user wants to perform an identical action on more than one of these links (e.g., opening the link-directed content in a new tab or window), the user may be required to individually interact with each link. This may cost significant time and/or effort.

To address one or more of these issues, embodiments of the present disclosure introduce a bulk action selection and performance method to reduce the number of inputs a user performs and to coordinate the treatment of actions performed with respect to depicted objects. The presently disclosed bulk action systems and methods achieve this by, for example, providing a client interface which may allow a user to select a set of objects simultaneously and a bulk action interface which may allow a user to select one or more bulk actions that may be applied to the set of objects previously selected.

As a non-limiting example, an issue tracking system, or other type of collaboration system, may include a graphical user interface which includes a set of displayed objects. The displayed set of objects may include links, text, icons, or other graphical elements that correspond to an issue or ticket being tracked by an issue tracking system. The displayed set of objects may also correspond to one or more spaces, pages, profiles, or other types of content used by a collaboration system or other networked platform.

In one example, a number of objects corresponding to different tickets or issues may be provided in a project summary and may display abbreviated information about the ticket (e.g., a ticket number, ticket title, project name, etc.). In accordance with the issue tracking system, a user may interact with a respective object to access a particular ticket and display expanded information, such as relevant dates, assignments, descriptions, and so on. In some cases, an additional window or tab may be generated to display the expanded ticket information after the user interacts with the associated object.

The client interface may include tools for permitting a user to select multiple objects at the same time. In some embodiments, the client interface may include tools for permitting the user to draw a shape (e.g., a rectangular shape) to select each of the objects positioned within the shape. In a non-limiting example, the user may draw a rectangular shape by holding a left- or right-click button on a mouse and creating a closed object surrounding the objects to be selected. In additional and/or alternative examples, various object selection methods may be used including, but not limited to, highlighting particular objects through the use of a highlighter tool, creating a selection rectangle/shape using a free-draw tool, capturing a screen image, and so on.

Once the client interface results in a selection of a set of objects, an object identifier may determine similarities between the selected objects by, for example, identifying a source and/or target associated with each object of the selected set of objects. For example, a subset of the set of objects selected through the use of the client interface may reference a ticket or issue in an issue tracking system. For example, the subset of the set of objects may be a link, including a ticket number, that is directed to a source and/or target, where the source or target may be an application (e.g., an external application) or a location which the objects directs to (e.g., via a uniform resource locator (URL)).

Continuing the above example, the object identifier may determine that each object of the subset of the set of objects corresponds to the issue tracking system and may identify a source and/or target associated with the issue tracking system as a respective source and/or target for each object of the subset of the set of objects. For example, the object identifier may identify respective tickets for each object of the subset of the set of objects.

In some cases, the subset of the set of objects may reference or be associated with different applications (e.g., some objects may be associated with an issue tracking system and some objects may be associated with a webpage). In such cases, the object identifier may identify, via a bulk action interface, multiple discrete sets of bulk actions that may be applied to the respective objects. In some cases, the system identifies common, shared, or generic actions that can be applied to objects from different sources and provide "generic" bulk actions to the user for selection.

In some cases, the object identifier may determine whether the selected objects share a common property. For example, the object identifier may classify each of the selected object in order to identify an object type, link type, platform, or other characteristic of the object that may be used to classify or group the objects based on (bulk) action type. Based on the identified common property, a bulk action interface may determine a set of bulk actions that can be applied with reference to multiple of the selected set of objects. This set of bulk actions may be presented to the user for selection and application to the respective selected objects. For example, a common property may be a common format as indicated by a link, associated metadata, and/or an object itself. For example, an object may be a clickable link that uses a URL to reference a particular location. In some cases, a common domain may be indicated by URLs associated with different objects and may be considered a common property. In additional or alternative examples, an object may be formatted according to a specific template or string (e.g., an object referencing a ticket may be "Ticket 2343"). The common format may additionally be considered a common property.

The following is a non-limiting example of a method in accordance with the provided disclosure. As described above, a set of objects may each correspond to a respective issue or ticket that is tracked by an issue tracking system. The set of objects may also correspond to other items or content of a collaboration system or other networked platform. In some cases, the objects are a combination of issue-type objects and non-issue-type objects. An object identifier may be used to identify a source and/or target for each of the selected objects and a corresponding set of actions that may be performed on the respective object in accordance with the source and/or target. For example a closed ticket or issue may have a different set of bulk actions than an open ticket, or a profile page of a user, or a project space or page. As described herein, the system may present a set of shared or common actions that may be applied to the complete set. The system may also present different bulk actions for subsets of objects that share the same available bulk actions.

In some cases, the object identifier may identify a common property (e.g., classification or category) of each of the selected objects and may determine that a first subset of the selected objects correspond to a first source/target (e.g., to tickets) and that a second subset of the selected objects corresponds to a second source/target (e.g., to a webpage). The object identifier may determine that the first subset of the selected objects (corresponding to the first source/target) outnumbers the second subset of the selected objects (corresponding to a second source/target). In some cases, the object identifier may mark each selected object (either visually, through a display, or through adding an identifier to each object) with the determined source/target. For example, the first subset of the selected objects may be marked with a marker corresponding to the first source/target and the second subset of the selected objects may be marked with a second marker corresponding to the second source/target (e.g., graphical markers).

Continuing the above example, subsequently, a bulk action analysis system may identify actions that are capable of being performed with respect to the selected set of objects. For example, the bulk action analysis system may query a database and/or stored data to identify bulk actions that correspond to sources/targets associated with the selected objects. In a non-limiting example, the bulk action analysis system may identify actions, such as updating a status of a ticket, opening a ticket in a new tab/window, logging a ticket, closing the issue associated with the ticket, and so on, that may be performed on each of the identified tickets corresponding to each object of the selected set of objects. Once the actions are identified, each identified action may be presented to a user, via, for example, an available bulk action menu, and the user may select one or a number of actions that the user would like to perform with respect to each object of the set of objects. In some cases, the system may present an additional bulk object menu to the user so that the user may select or deselect one or a set of objects corresponding to sources/targets on which the bulk actions will be performed. After the system receives the user input, from either one or a number of menus, the system may enact the performance of the selected bulk actions. In this way, a user may perform a number of corresponding actions simultaneously without needing to independently interact with multiple objects.

An issue tracking system, as described herein, may be used to refer to a tool that may be specially configured for tracking issues and tasks that are associated with a software development project. As described herein, an issue tracking system may be used to refer to a tool that can be implemented in whole or in part as software executed by a virtual or physical server or other computing appliance that provides a team of individuals with a means for documenting, tracking, and monitoring completion of work as discrete tasks related to completion, development, or maintenance of a defined project or goal. In some examples, an issue tracking system is configured for use by a software development team to track completion and assignment of discrete tasks related to software development projects from creation of new user stories (i.e., user-perspective feature requests or desired functionality), through proof of concept testing, through integration testing, through release of software to one or more users, and through reporting and fixing of software errors ("bugs"). In other cases, an issue tracking system can be configured for non-software tracking purposes, such as for use by a human resources team, an information technology support group, and so on.

An issue tracking system, as described herein, may increase the efficiency of a team of individuals working on a common goal or project by facilitating the organization of the assignment of discrete items of work to the individual or team of individuals most suited to perform that work. More particularly, each item of work tracked by an issue tracking system is referred to as an "issue" that is typically assigned to a single individual to complete. Example "issues" can relate to, without limitation: a task to identify the cause of a software bug; a task to perform a feasibility assessment for implementation of a new feature; a task to fix an identified software bug; and so on. The term "ticket" may refer to containers that contain and/or display one or more issues.

As described herein, an issue tracking system may be an example of a collaboration system or platform. A collaboration system refers to a tool that provides document storage and access functionality to one or more teams and/or members of a team. Various types of collaboration systems allow users to create pages in order to share content. Such collaboration systems may be client-server systems: the server provides an interface (via a client) for users to create pages, stores pages and associated content, and responds to client requests to view pages.

In such systems, users may create pages that include objects such as in-page content and links to digital content items (e.g., "content"). When a page is requested by a client of the collaboration system, in-page content (typically text and images) is served with the page and displayed in the page when the page is rendered on a user device by the client.

Objects, such as links, may also be served with the page in order to be displayed, however the actual content items referenced by such objects are not served and displayed unless specifically requested by the client (e.g. by a user activating the object).

Many different types of content can be linked to in a page, for example: document content items; drawing/image content items; three-dimensional content items; audio content items; video content items; presentation content items; spreadsheet content items; and any other type of content.

As described herein, bulk action analyses and other aspects of the provided disclosure may be performed by a collaboration system such as an issue tracking system. In some cases, the provided systems may be performed by an extension (e.g., a browser extension), an integration (e.g., an integration between two systems), a browser, a separate application, or any other system where multiple objects are provided. It is noted that, where one such system is described herein, any related or alternate system that depicts or otherwise provides multiple objects, such as an Internet browser, a wiki page, and so on, may additionally perform the above functions, either directly or through the use of an intermediary system.

These foregoing and other embodiments are discussed below with reference to FIGS. 1-8. However, those skilled in the art will readily appreciate that the detailed description given herein with respect to these figures is for explanatory purposes only and should not be construed as limiting.

FIG. 1 is a schematic representation of an example system. In the illustrated embodiment, the system 100 is implemented with a client-server architecture including a host service 106 that communicably couples, via a network 104, for example, to one or more client devices, one of which is identified as the client device 102. It may be appreciated that other client devices may be configured in a substantially similar manner as the client device 102, although this may not be required of all embodiments and different client devices may be configured differently and/or may transact data or information with, and/or provide input(s) to, the host service 106 in a unique or device-specific manner. Any system or combination of systems may be used in accordance with a bulk action analysis server 112 of the present disclosure, including collaboration systems, integrations between systems, browser extensions, discrete applications, and so on. As discussed with reference to FIG. 2, a bulk action analysis service 212 may be provided to replace the bulk action analysis server 112 and may be loaded/stored on an external server (e.g., a server associated with the host service 106) or on a client device through a client application.

The client device 102 may be any suitable personal or commercial electronic device and may include, without limitation or express requirement, a processor 102a, volatile or non-volatile memory (identified, collectively, as the memory 102b), and a display 102c. Example electronic devices include, but are not limited to: laptop computers; desktop computers; cellular phones; tablet computing devices; and so on. It may be appreciated that a client device 102, such as described herein, may be implemented in any suitable manner.

In many embodiments, the processor 102a of the client device 102 may include one or more physical processors or processing units that, alone or together, may be configured to execute an application (herein referred to as a "client application") stored, at least in part, in the memory 102b. The client application is configured to access and communicate with the host service 106, and to securely transact information or data with, and provide input(s) to, the host service 106 over a network 104. In some embodiments, the client application may be a browser application configured to access a web page or service hosted by the host service 106 that is accessible to the client device 102 over a private or public network that may, in some embodiments, include the open internet. Either a wired (e.g., via cables) or a wireless (e.g., via wireless communications) network may be implemented as the network 104. In some cases, features associated with the bulk action analysis server 112 and/or bulk action analysis service 212 may be stored on the memory 102b of the client device and may be used via the client application.

In many embodiments, the host service 106 is configured to operate within or as a virtual computing environment that is supported by one or more physical servers including one or more hardware resources such as, but not limited to (or requiring) one or more of: a processor; a memory; non-volatile storage; networking connections; and the like. As used herein, a processor of the host service 106 may refer one or more physical processors or processing units implemented on one or more physical computing systems that, alone or together, may be configured to implement the functionality described herein. The host service 106 may be implemented on a single computing system or using a distributed network of computing systems. For simplicity of description and illustration, the various hardware configurations associated with a processor, computing device, or hardware architecture are not shown in FIG. 1.

In many embodiments, the host service 106 may include a number of discrete subservices or purpose-configured modules, containers, or virtual machines each configured to perform, coordinate, serve, or otherwise provide one or more services, functions, or operations of the host service 106, such as the operations of identifying sources associated with selected objects and/or detecting common properties of selected objects, operations of identifying relevant bulk actions, and/or operations of tracking issues through the use of the system 100.

In the illustrated embodiment, the host service 106 includes one or more purpose-configured modules or components each configured to perform tasks associated with the operation of the system 100. In particular, the host service 106 includes a collaboration server 108, a repository server 110, and a bulk action analysis server 112. It may be appreciated that although these functional elements are identified as separate and distinct "servers" that each includes allocations of physical or virtual resources (identified in the figure as the resource allocations 108a, 110a, and 112a, respectively), such as one or more processors, memory, and/or communication modules (e.g., network connections and the like), that such an implementation is not required. More generally, it may be appreciated that the various functions described herein of a host service 106 can be performed by any suitable physical hardware, virtual machine, containerized machine, or any combination thereof. In some cases, the bulk action analysis server 112 may be integrated with the collaboration server 108 and may be used as a feature of the collaboration server 108. Further, in some cases, the bulk action analysis server 112 may be provided as an external component with respect to a collaboration server 108. For example, the bulk action analysis server 112 may be external to the host service 106 and may be connected to the host service 106 via the network 104.

Information or data related to projects tracked by the system 100, such as a codebase of a software development project, may be stored, in many embodiments, in a database managed by the repository server 110, which can be communicably and securely coupled to the collaboration server 108. The repository server 110 may be used to store or maintain a repository of records, record groups, record clusters, and/or other data related to the creation and maintenance of project information. The database(s) managed by the repository server 110 may be implemented with any suitable known or later developed database or digital information storage technology or technique. In many examples, the repository server 110 is configured to track and maintain a record of changes made to data or information stored in the database(s) managed by the repository server 110, but this may not be required.

In some embodiments, the host service 106 is configured to receive requests from the client device 102 via the network 104. As incoming requests are received, the collaboration server 108 may perform analyses on the requests and may use the requests to select a set of objects and/or to perform actions, based on the requests, on one or more of the set of objects. As depicted in FIG. 1, the bulk action analysis server 112 may be configured to analyze previously selected objects, identify a source/target associated with the selected objects, and determine bulk actions to be presented, via a client application, to a user of the client device 102.

As described above, the collaboration server 108 and/or the repository server 110 may contain information concerning various records and may cause the display of the objects that correspond to, or otherwise reference or direct to, the various records in a graphical user interface, on the client device 102. In some examples, the various records may include documents, such as editable files, research papers, and word processing files, tickets, links, menus, editable text-boxes, and so on. Each of the records or stored data items may include one or a number of properties that may be stored as, for example, metadata. The objects associated with the records or stored data items may be graphical elements that are displayed in the graphical user interface. The objects may be, for example, a link or an image and may direct a user of the graphical user interface toward the associated records. The objects may additionally include various properties. Examples of properties associated with objects include a file extension (e.g., .PDF, .DOC, and so on), a flag indicating a data category, an associated source or application, a format of the object (e.g., a link or format), and so on.

One or any number of objects may be presented to a user of the client device 102 via at least one of the collaboration server 108 and/or the repository server 110. As discussed herein, the bulk action analysis server 112 may include, or may be otherwise associated with, a client interface and a bulk action interface. The client interface may permit a user of the client device 102, via an input-output device, such as a touch-sensitive display, a mouse, a keyboard, and so on, to select multiple objects (see, e.g., FIG. 4A). The manner in which the client interface permits selection of multiple objects is not particularly limited and may include a drawing tool, a click-and-drag box formation tool, a highlighting tool, a multi-click tool, and any other tool or system which permits a user to select multiple objects. Through the use of the client interface, a user may select multiple objects of the collaboration server 108. In some cases, the client interface may be loaded onto the client device 102 and may be stored in a memory 102b of the client device.

The bulk action analysis server 112 may further analyze the selected objects based on communications between the host service 106, including the collaboration server 108 and the repository server 110, and the client device 102. For example, through the use of the client interface, a user may select a number of objects. The objects, and information concerning the objects as stored, for example on the repository server 110, may be communicated to the bulk action analysis server 112 for analysis. The bulk action analysis server 112 may analyze the objects, as selected through the use of the client interface, to identify respective sources/targets associated with the objects.

Once the bulk action analysis server 112 has identified a source/target associated with each object, the bulk action analysis server 112 may communicate with an internal data store, the collaboration server 108, or the repository server 110 to identify actions that may be performed with respect to the selected objects, based on the identified source/target. For example, a look-up table may be provided (e.g., within the repository server 110) that stores properties with actions that may be performed with respect to objects corresponding to a particular source. In a non-limiting example, the identified source of the selected objects may correspond to a ticket of an issue tracking system. By using, for example, a look-up table, a set of actions may be identified based on the determination that the source corresponds to a ticket of an issue tracking system. For example, actions such as assigning a ticket to a particular user, updating a status of a ticket, opening a ticket in a new tab or window, and so on may be identified. Based on this identification, the possible actions may be displayed on the client device 102 and an associated user may select one or more of the possible actions to perform with respect to each of the selected objects. This selection may be received by the host service 106 as a user input and the collaboration server 108, or associated systems, may perform the selected actions, in bulk, with respect to each of the selected objects, as described herein.

The foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
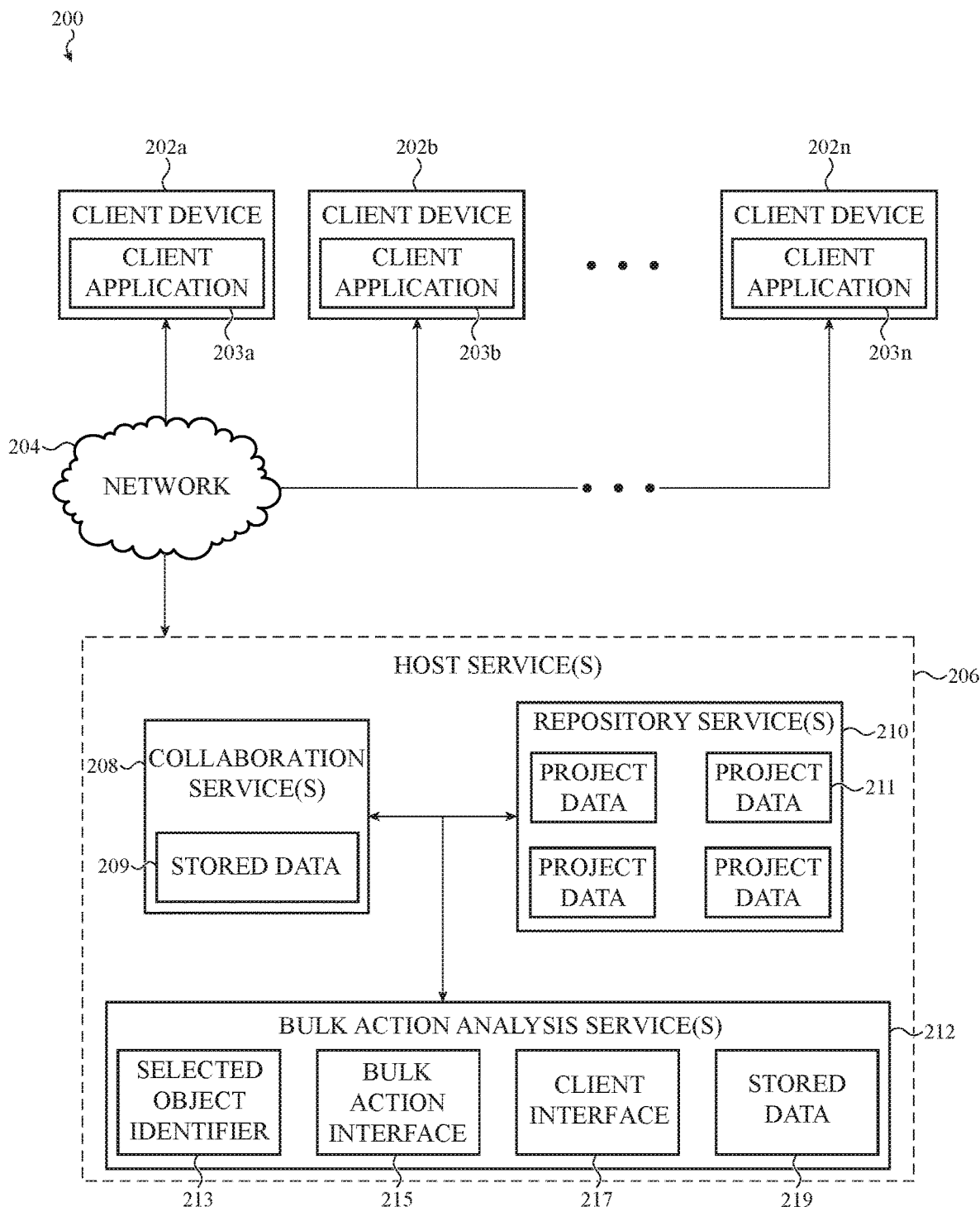
FIG. 2 depicts a signal flow diagram of a system including a bulk action analysis service, such as described herein.

FIG. 2 depicts a system and signal flow diagram of an issue tracking system, such as described herein. The system 200 can be configured, both physically and operationally, in the same manner as the system 100 described in reference to FIG. 1 and duplicative descriptions may be omitted herein.

As described herein, the system 200 may reference any kind of system, such as collaboration systems (including issue tracking systems).

The system 200 may include a host service 206 (also referred to herein as a host system) that is configured to communicate with one or more client devices, which are identified as the client devices 202a-202n. As with other embodiments described herein, the client devices 202a-202n can be configured to execute respective client applications 203a-203n that are configured to transmit information and data with the host service 206 via a network 204. The client applications 203a-203n provide a graphical user interface to facilitate interaction between the system 200 and a user of that system.

The host service 206 includes a collaboration service 208 that is communicably coupled to a repository service 210 and a bulk action analysis service 212. As with other embodiments described herein, collaboration service 208 may include stored data 209 that is configured to store information related to issues reported and closed for projects related to the system 200. Similarly, as noted above, the repository service 210 may be configured to store information or data related to one or more projects of the system 200. For example, in one such case, the system 200 is configured for use by a software development team. In this example, the repository service 210 may include a version-controlled database that maintains a codebase for a project stored as project data 211.

As with other embodiments described herein, the host service 206 may also include the bulk action analysis service 212. In the illustrated embodiment, the bulk action analysis service 212 may include a number of discrete subservices or purpose-configured modules, containers, or virtual machines each configured to perform, coordinate, serve, or otherwise provide one or more services, functions, or operations of the bulk action analysis service 212. More particularly, the bulk action analysis service 212 may include a selected object identifier 213, a bulk action interface 215, a client interface 217, and stored data 219. In some cases, the bulk action analysis service 212 may be fully or partially stored on any one of the client devices 202a-202n.

The selected object identifier 213 of the bulk action analysis service 212 may be configured in any suitable manner to implement the operation of identifying selected graphical objects. As noted above, this operation can be performed in a number of ways. An example method by which selected objects may be identified is through identifying file extensions or metadata associated with each of the selected objects. In additional or alternative examples, textual analysis may be performed on the selected objects to determine a source associated with each object of the selected objects. For example, issue descriptions can be compared using any suitable text comparison technique. The selected object identifier 213 may additionally determine a common property of each selected object. For example, in cases where five objects are selected, the selected object identifier 213 may determine which property is common, or most common, across each of the five selected objects. In some cases, the selected object identifier 213 may analyze a screen capture of objects on a graphical user interface presented on a client device and may identify objects based on the screen capture.

The bulk action interface 215 of the bulk action analysis service 212 may be configured in any suitable manner to implement or otherwise perform the operation providing actions which may be performed with respect to a number of selected objects. More specifically, in one example, the bulk action interface 215 may query stored data 219 (or data stored in repository service 210 with respect to project data 211) to determine which actions may be performed with respect to objects associated with a particular source/target. For example, if an object references a ticket, the bulk action interface 215 may determine that possible actions include determining assignment statuses of each ticket, determining deadline data for each ticket, determining a bug category for each ticket, and so on. The bulk action interface 215 may additionally cause the display of a bulk action menu on any one of the client devices 202a-202n, where the bulk action menu presents selectable actions which may be performed with respect to each of the selected objects (see, e.g., FIG. 6).

The client interface 217 of the bulk action analysis service 212 may be configured in any suitable manner to implement or otherwise perform the operations of generating graphical elements to be presented on any of client applications 203a-203n. For example, the client interface 217 may receive information about the selected objects via the selected object identifier 213 and the bulk action interface 215 and may be configured to determine which graphical elements (e.g., a menu) to provide to a user. In some cases, the client interface 217 may provide instructions for installing drawing and/or selection tools on the client applications 203a-203n for use in selecting one or a number of objects as generated by the collaboration service 208 and/or displayed on any one of the client devices 202a-202n through client applications 203a-203n. In one example, the client interface 217 may cause installation of drawing tools, selection tools, and/or graphical elements to mass-select a number of objects, as described above. For example, the client interface 217 may cause installation of tools which permit a user to draw, or otherwise form, a geometric shape around an area of interest containing one or more objects. The geometric shape may be drawn free-form (e.g., with a pencil tool), may be created through click-and-drag functionality (e.g., by clicking and dragging on a user interface through a mouse), and so on. In some cases, the geometric shape may be rectangular, but any shape, including circles, stars, triangles, and so on, may be used.

The stored data 219 of the bulk action analysis service 212 may be configured in any suitable manner to implement or otherwise perform the operation of recording one or more detected patterns of objects. The stored data 219 may be accessed by any module or component of the bulk action analysis service 212 at any suitable time to determine whether a particular object corresponds to a source and/or which actions to select with respect to each particular object.

It may be appreciated that the foregoing simplified examples are not exhaustive of the various possible components, systems, servers, and/or modules that may be used by an issue tracking system, such as described herein. Accordingly, more generally and broadly, it may be appreciated that systems aside from issue tracking systems, such as browsers, collaboration systems, applications, and so on, may utilize the methods and processes described herein.

Figure 3:
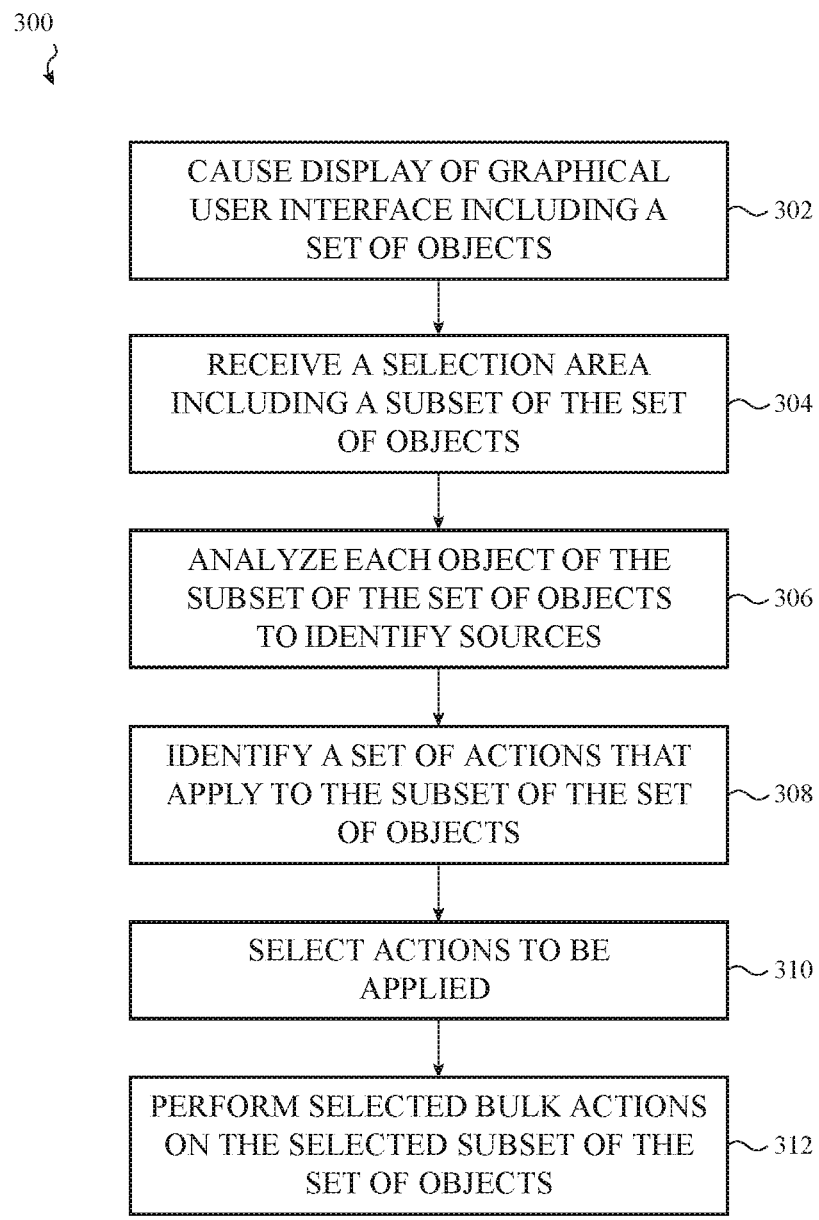
FIG. 3 is a flowchart that depicts example operations of a method of selecting a set of objects and performing bulk actions on the selected set of objects, such as described herein.

FIG. 3 is a flowchart that depicts example operations of a method of selecting multiple objects and performing bulk actions on the selected objects, such as described herein. The method 300 may be performed by any hardware or software, whether virtual or otherwise, such as described herein. In one example, the method 300 is performed, in whole or in part, by a bulk action analysis server, such as described above.

Figure 4A:
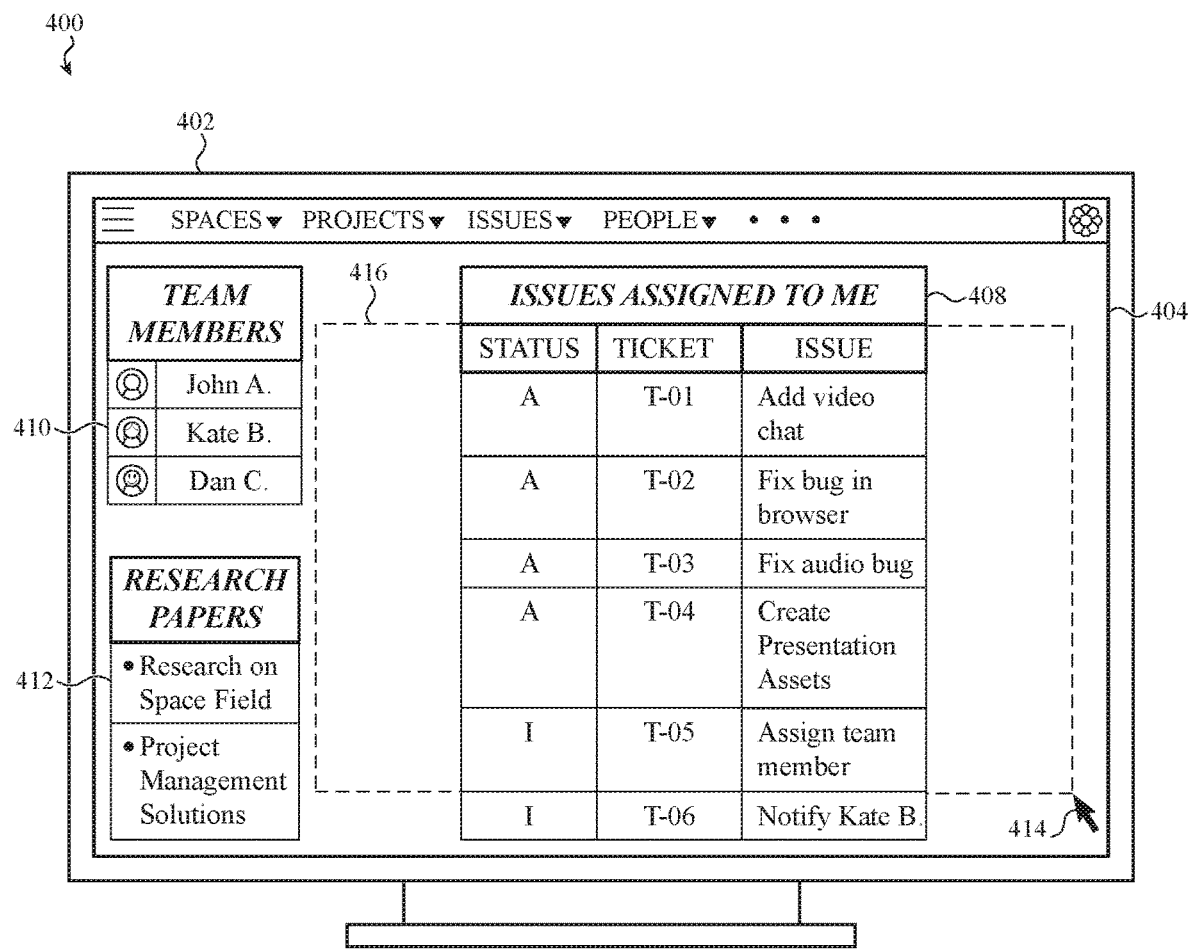
FIGS. 4A and 4B depict example user interfaces related to bulk action selection of a set of objects and the performance of selected bulk actions on the set of objects, such as described herein.
Figure 4B:
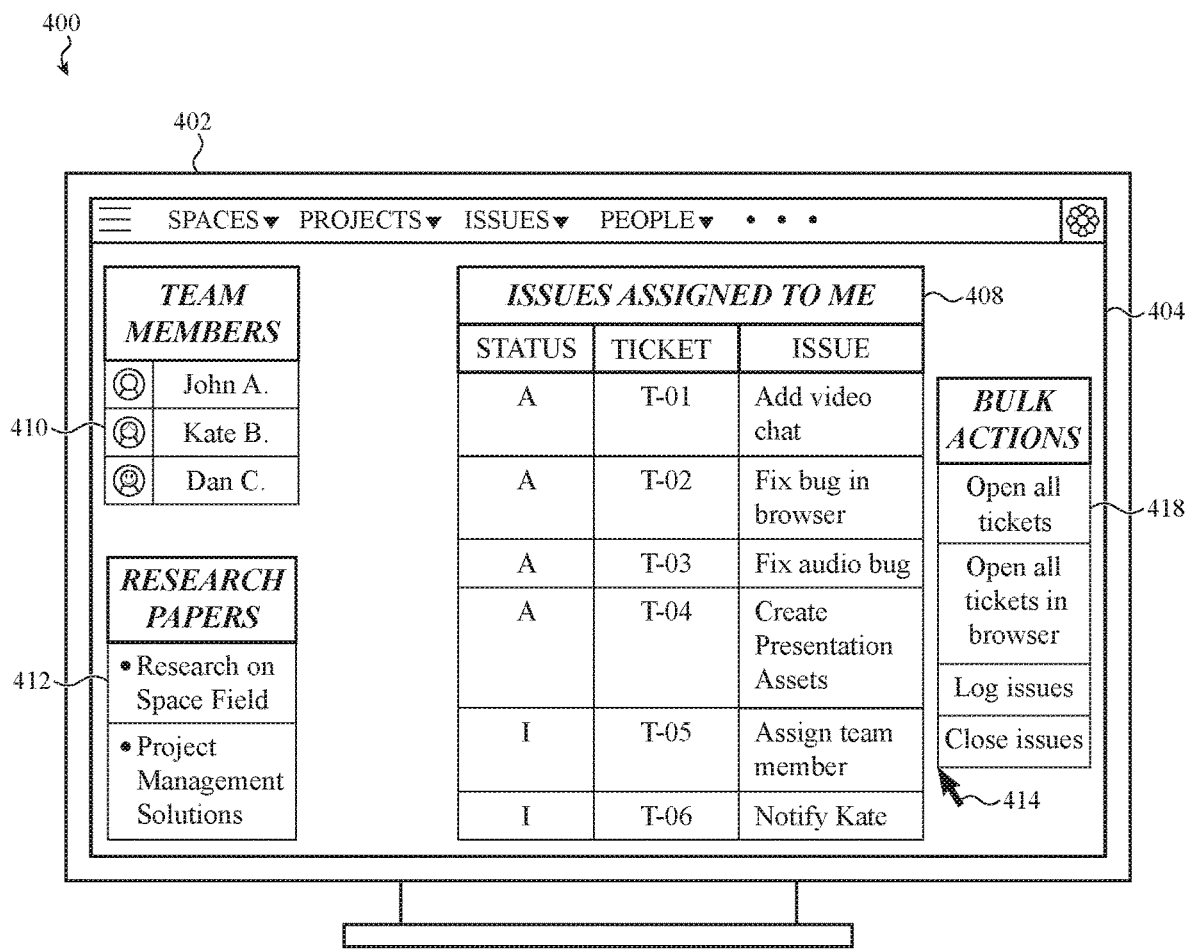

The method 300 includes operation 302 in which a graphical user interface is displayed on a client device (e.g., client devices 102 or 202, as described above). The graphical user interface may be a graphical user interface of an issue tracking system, a collaboration system, a browser, a word processing application, or any other system or application configured to display graphical objects. The graphical user interface may include a set of interactable graphical objects. In a non-limiting example, an object may correspond to, or otherwise display a graphical correlation to, a ticket containing information related to an issue tracked by an issue tracking system. In additional or alternate examples, an object may be a link to, for example, a web page or information stored in a local or external database. An example of a graphical user interface in accordance with the provided disclosure is depicted in FIGS. 4A-4B, as presented. Each of the set of objects may be associated with a respective source/target and/or may share a common property. For example, a source/target may be a particular ticket corresponding to an issue tracking system and/or a collaboration system and a common property may reference a category of the objects such as a link, a common graphical element, a ticket format, and so on.

At operation 304, a selection area of a subset of the set of objects is received via the graphical user interface. For example, a user of a client device on which the graphical user interface is displayed may select the subset of the set of objects by highlighting the subset of objects, drawing a geometric shape around the subset of objects, capturing an image of the graphical user interface, and so on, such as described herein. This selection may be referenced as a selection area, as the term is used herein. In some cases, once a selection of a subset of the set of objects is performed by a user of a client device, the selection, or information corresponding to the selection, may be transmitted to an issue tracking system and/or a bulk action analysis system for analysis. Any sort of selection area and/or creation of a selection area may be used in accordance with the provided disclosure. For example, the selection area may be drawn using drawing tools, may be a window where objects are dragged-and-dropped, may be created using a drag-and-click method, may be a screenshot of an entire or partial user interface, and so on.

At operation 306, the system may analyze each object of the subset of the set of objects and may identify respective sources/targets associated with each object. In some cases, a selected object identifier (e.g., the selected object identifier 213) may perform a textual analysis on information associated with a particular object, or the object itself, to determine a particular source/target. For instance, an object may include a string of letters, numbers, or other symbols, which may be analyzed by the system to identify the source or target. Based on the string, the system may classify the object as belonging to a platform or service and, in some instances, identify the specific source or target that is referenced by the object. For example, the object may be a ticket and may include a phrase such as "ITS Ticket T-01." The selected object identifier may analyze the symbols or text associated with the object and may determine that the phrase corresponds to an issue tracking system, and may determine that the object is associated with an issue tracking system platform and, in some instances, the specific ticket as the source.

Operation 306 may, in some implementations, involve analysis of the link or target associated with the object. For example, the system may be configured to analyze the URL or other link information in order to determine the source or platform associated with the object. The domain or a portion of the URL path may be used to identify the platform or service and, in some cases, may be used to identify the specific target associated with the object. In circumstances where the URL is obscured or if the target is unable to be resolved by a analyzing the URL itself, the system may be adapted to access at least a portion of the information at the URL in order to determine the source or target. For example, the system may use the URL to access metadata or other data stored at the URL location in order to determine the source information including the platform or other information about the object.

In some cases, the bulk action analysis system may determine a common property, feature, and/or category of each of the subset of the set of objects. In some cases, the system may classify the object according the platform type, object type, link type, or other aspect of the selected object(s). A common property may refer to objects that are of the same type or category. In the case of an issue tracking system, one or more objects may be analyzed to determine a common property (e.g., object classification) that may associate the one or more objects with an issue tracking system or as being ticket-type objects. In the case of another collaboration system, an object may be analyzed to determine a common property (e.g., an object classification), which may associate the object with a particular project, team, organization, or user. In some cases, the object is analyzed to determine that it is a page, image, document, or other element of a content collaboration system, which may correspond to a particular object type. As described below, the object type may be used to determine an appropriate set of actions that may be performed on the one or more similarly classified objects. Similar to as described above, the common property or object classification may be determined by textual analysis of the objects, object URL, or associated metadata or other information associated with the URL.

In some cases, each object selected at operation 304 may not share a common property. In such situations, the common property may be any property shared by one or more of the selected objects. For example, if a user selects four objects associated with tickets and two objects associated with links, the common property may be considered to be the common property associated with the four tickets. Thereby, the two objects associated with links may be ignored and any bulk action applied (e.g., at operation 308) may not be applied to the two links as they don't share a common property with the four tickets. In alternate or additional cases, multiple common properties may be identified. Continuing the above example, a first common property identifying four objects as corresponding to tickets may be determined and a second common property identifying two objects as corresponding to links may be identified. As discussed herein, bulk actions may be performed on each category (associated with the first and second common properties) of objects and/or generic actions covering objects sharing the first common property and the second common property may be identified.

At operation 308, a bulk action analysis system, or other associated system, may analyze the selection received at operation 304 to determine a set of actions that apply to the selected subset of the set of objects. In operation 308, one or more actions may be determined based on the classification of the various objects and/or source associated with the various objects, as determined in operation 306. In some cases, actions associated with certain properties may be stored in a data store (e.g., a table stored within the data store) and the data store may be queried with the common property to identify associated actions. With reference to FIG. 5, when, in an example, the common property corresponds to tickets, the associated actions may include "open all links," "open all links in browser," "log issues," "close issues," and so on. In some cases, when the common property corresponds to links to external references, the associated actions may include "download files," "open links in new tab," and so on. It is noted that the provided examples are merely explanatory and any actions may be associated with identified properties.

Further, in some cases, the identified sources may correspond with certain actions as determined by, for example, querying a look-up table or database. For example, if an identified source is collaboration system, potential actions that may be applied to the subset of the set of objects may include "email object to a user," "format object," "update a deadline associated with the object," "download files," and so on.

At operation 310, the a set of options corresponding to the identified actions may be provided on a client device as an available bulk action menu (see, e.g., FIG. 5) and a user may select one or any number of the set of options corresponding to the identified actions by marking options within the available bulk action menu (e.g., by an input-output device). In additional or alternative cases, actions may be automatically selected based on, for example, user settings, default actions, or any other method of choosing actions. As discussed above with respect to FIGS. 1 and 2, the selected actions may be transmitted to a collaboration system, or other system, and may be used to instruct the collaboration system, or other system.

At operation 312, the selected actions may be performed, with respect to a collaboration system or other system as described herein. The selected actions may be performed as bulk actions. That is, each selected action may be performed with respect to each of the selected subset of the set of objects (e.g., as identified at operation 304) that share a source/target and/or a common property. In some cases, each selected action may be performed simultaneously. In additional or alternative cases, objects that do not share the source/target and/or common property may be ignored so that the selected actions are not applied to these objects. In some cases, the selected actions may be performed at different times. For example, if a selected action is to download data from an external server, the method 300 may cause the display of a scheduler which allows a user to select times and/or a rate at which content is downloaded. In some cases, the scheduler may be performed automatically when the system determines that simultaneous downloads associated with selected objects may overload a client device. For example, the scheduler may be established to download files associated with the selected objects one at a time and may automatically download the next file without any additional user input. In some cases, the scheduler may use a predetermined time (e.g., when a client device is unlikely to be in use) to download the indicated files as associated with the selected objects.

As noted above, the method 300 may be performed on a client device, on cloud-based servers, on external servers, or any combination thereof. In some cases, the method 300 may be performed by a browser extension or by a feature of an issue tracking system, a collaborative system, and so on.

FIGS. 4A and 4B depict an example graphical user interface of an issue tracking system, as displayed on a client device. It is noted that, while FIGS. 4A and 4B depict a graphical user interface of an issue tracking system, any system and/or graphical user interface may be displayed in accordance with the provided disclosure and the provided disclosure is not limited to being performed with respect to an issue tracking system.

A bulk action system 400 may include a client device 402. The client device may include a display depicting a graphical user interface 404 including, for example, a toolbar, a number of graphical elements, and so on. For example, the graphical user interface 404 may additionally include a number of object categories, such as a team member object category 410, a research paper object category 412, and an assigned issue object category 408. In some cases, other object categories may be provided and the provided disclosure is not limited to the object categories displayed in FIGS. 4A and 4B.

Each of the object categories may further include objects. For example, the team member object category 410 may include a number of team members (e.g., "John A.") as objects, the research paper object category 412 may include research papers, or links, as objects, and the assigned issue object category 408 may include issues, or tickets, as objects. Other objects in addition to those depicted in FIGS. 4A and 4B may be used in accordance with the provided disclosure, such as links, data items, and so on.

To select a set of objects, a user may create a selection area surrounding the set of objects. In an example, a cursor 414 may be provided and may be controlled through the use of, for example, a mouse and/or keyboard. A user may manipulate the mouse and/or keyboard to control the movement of the cursor 414 as the cursor 414 moves through the graphical user interface 404. In some cases, a user may press a button on an input device (e.g., the user may hold a right-click button on a mouse) in order to initiate an object selection process. Through the object selection process, a user may create a pivot and/or generation point where a geometric object is created. As the user controls the cursor 414, a size and/or shape of the geometric object may be controlled, where the pivot and/or generation point and the cursor 414 are positioned at opposing vertices, as depicted in FIG. 4A. While the geometric object is depicted as a rectangle in FIG. 4A, it is noted that any shape may be used in accordance with the provided disclosure. As discussed above, in some cases a client interface may provide drawing tools which may permit a user to draw a shape, using, for example, a pencil tool, around particular objects. It is noted that the provided examples are merely exemplary and any method of creating a selection area 416 may be used. The geometric object in FIG. 4A is referred to as a selection area 416.

In FIG. 4A, the selection area 416 surrounds a set of objects corresponding to tickets T-01, T-02, T-03, T-04, and T-05. Ticket T-06 is outside the selection area 416, as depicted in FIG. 4A. Therefore, in the depicted embodiments, the tickets T-01, T-02, T-03, T-04, and T-05 are 'selected' while ticket T-06 is 'unselected.' An available bulk action menu 418, as depicted in FIG. 4B, may be presented on the graphical user interface 404 in accordance with an activation of the selection area 416. An activation may refer to a button press or a button release (e.g., on an input device), a time delay, or any other event that signals a selection of the objects within the selection area 416. The available bulk action menu 418 may be populated by identifying a source/target of the selected objects and/or by querying a table or data store about actions that correspond to the source, as discussed herein.

As depicted in FIG. 4B, the available bulk action menu 418 is a pop-up menu. However, any graphical object may be used as the available bulk action menu 418 including a new window, a drop-down menu, and so on. The available bulk action menu 418 may include actions which may be performed for each of the selected objects (e.g., in FIG. 4B the tickets T-01, T-02, T-03, T-04, and T-05). For example, each of the selected objects may be opened (either in a browser or in an instance of the system), logged, or closed, as depicted in FIG. 4B. While the aforementioned actions are depicted in FIG. 4B, it is appreciated that any number of corresponding actions may be provided in the available bulk action menu 418.

Each action depicted in the available bulk action menu 418 may be interacted with to perform the indicated function. For example, if a user presses (e.g., with the cursor 414) the "log issues" action, each of the issues present in the previously described selection area 416 may be logged in accordance with functionality of an issue tracking system or other potential system. Additionally, if a user interacts with the "open all tickets in browser" the system may cause the tickets associated with the selected objects to open in a separate application (e.g., an Internet browser).

While the selection area 416 is depicted in FIGS. 4A and 4B as selecting a number of objects associated with tickets, it is appreciated that any object may be selected. For example, objects in the research paper object category 412 may be mass-selected and an available bulk action menu may be generated with respect to actions possible on the selected objects corresponding to the research papers.

FIG. 5 depicts an example available bulk action menu 518 in accordance with the provided disclosure. As described above with respect to FIG. 4B, the available bulk action menu 518 may include a number of actions 520 that may be performed with respect to each of a set of selected objects. For example, the "update status" action may update a status associated with each selected object to indicate that, for example, a ticket associated with an object is "in progress."

In FIG. 5, a number of selectable check-boxes are provided next to each available action. Each check-box may be toggled to indicate whether the action will be performed or whether the action will not be performed with respect to each of the selected objects. The marking or un-marking of certain check-boxes associated with the number of actions 520 may be received by a user from a client device in the form of a user input. In the example depicted in FIG. 5, the actions "Open all tickets," "Log issues," and "Update Status: In Progress" are marked. Once a user is satisfied with the selection of the number of actions 520, the user may interact with a submit button 522 to indicate that the associated system should cause performance of the selected actions. For example, in the depicted case, once a user interacts with the submit button 522, the system may open all tickets associated with the previously selected objects, may log issues associated with the previously selected objects, and may update the status of each ticket associated with each selected object to "In Progress." In this way, each of the actions indicated may be performed simultaneously with respect to each selected object. An example of a graphical user interface after an associated system performs the indicated actions appears in FIG. 7.

In some cases, certain actions of the number of actions 520 are mutually exclusive, and if a user attempts to check two mutually exclusive actions (e.g., "Update Status: In Progress" and "Update Status: Complete") one check-box associated with one action may be greyed out or otherwise made unselectable.

FIG. 6 depicts an example object selection menu 624 in accordance with the provided disclosure. In some cases, the object selection menu 624 may replace the selection area 416. In alternate cases, the object selection menu 624 may be generated after or before the available bulk action menu 518 is displayed to a user of a client device and may be displayed in addition to a user's previous interactions with the selection area 416.

The object selection menu 624 may include a set of objects 626, a select all graphical element 628, and a deselect all graphical element 630. As discussed with respect to FIG. 5, each object of the set of objects 626 may be provided with a selectable check-box which may be toggled between active and inactive states. By toggling the check-boxes, a user may select which objects the actions indicated in FIG. 5 will be performed with respect to. In some cases, the presented objects in the set of objects 626 may correspond to the objects selected in a previous operation (e.g., objects selected in a selection area 416 as described with respect to FIG. 4).

A select all graphical element 628 may additionally be provided. When the select all graphical element 628 is interacted with, the system may activate (e.g., by checking a check-box) each of the depicted objects. Conversely, when a deselect all graphical element 630 is interacted with, the system may deactivate (e.g., by de-selecting a check-box) each of the depicted objects. In some cases, a submit graphical element may additionally be provided. In some cases, once a user has interacted with the object selection menu 624, the bulk actions identified (e.g., in FIG. 5) may be performed. In some cases, links or other information associated with the objects may be provided and a user may edit the associated links, so as to identify potential errors associated with the links.

FIG. 7 depicts an example system 700 including a graphical user interface 704 as it may appear on a client device 702 after the selected actions have been performed. In FIG. 7, the performed bulk actions correspond to the actions and/or objects indicated in FIGS. 5 and 6 though it is noted that this is merely explanatory. With reference to FIG. 5, the "Open all tickets" action has been selected. The system 700 may perform this action and may open each indicated ticket (e.g., tickets T-01-T-05) as graphical elements 740*a*-740*e*. By opening each ticket, additional information may be displayed, including priority statuses, labels, statuses, and descriptions. These tickets may be opened simultaneously, in some cases, or may be opened consecutively. In some cases, the tickets may be opened in a new tab or window, as described herein.

Further, with reference to the "Log issues" action, an issue log 742 may be displayed on the graphical user interface. The issue log 742 may include information such as a ticket number, a time/date that the ticket was logged, and an issue corresponding to a particular ticket. The issues may additionally be logged in an external data store and may, in some cases, be stored without being presented in the graphical user interface. It is noted that the provided issue log 742 is merely explanatory and additional or fewer information may be provided therein.

With reference to the "Update Status: In Progress" action, FIG. 7 depicts, within the assigned issue data category 708, updated statuses with the indicator "IP," which may stand for "in progress." This action may be performed with respect to each previously selected object (e.g., the ticket T-06 remains unaffected) and may be performed simultaneously. This may reduce or eliminate the need to interact with each object individually, as described herein.

In some cases, various actions may be taken that order or otherwise represent selected objects. In some cases, the selected object may be ordered by upcoming deadlines, so that a user may easily see which issues associated with objects should be taken care of first.

In some cases, the bulk action processes may be performed in combination with other queries in an associated system. For example, a user may execute a search/query within a data store of a system and may, for example, pull up objects that correspond to bugs that are close to or have violated deadlines associated with the bugs. Once the corresponding objects have been presented to the user, the user may perform a mass-selection of the objects, as described herein, and may see various actions which may be performed with respect to the objects. For example, for each of the selected objects and by way of selections corresponding to actions, the user may open issues corresponding to the objects in a unique tab or window, may determine which issues corresponding to the objects are unassigned to team members, may determine which team is associated with certain issues, may see additional information about issue deadlines, and so on. In some cases, the actions may permit a user to determine a category of each issue (e.g., whether the issue is related to security issues, architectural issues, functional issues, and so on). In practice, this may allow a user to perform actions in bulk with respect to issues corresponding to selected objects.

Though FIG. 7 depicts visual changes in a system 700, it is noted that actions may additionally correspond to actions which do not result in a change in a graphical user interface. For example, an action may be to modify data associated with a ticket. This data modification action may change data stored (e.g., in a data store) with respect to the ticket, but may not necessarily cause a corresponding visual change. For example, a user may want to change a location where information associated with a ticket is stored and may cause performance of an action for the same. While this may change aspects of how the ticket is stored, this change may or may not be visually indicated to a user via the associated graphical user interface.

Figure 8:
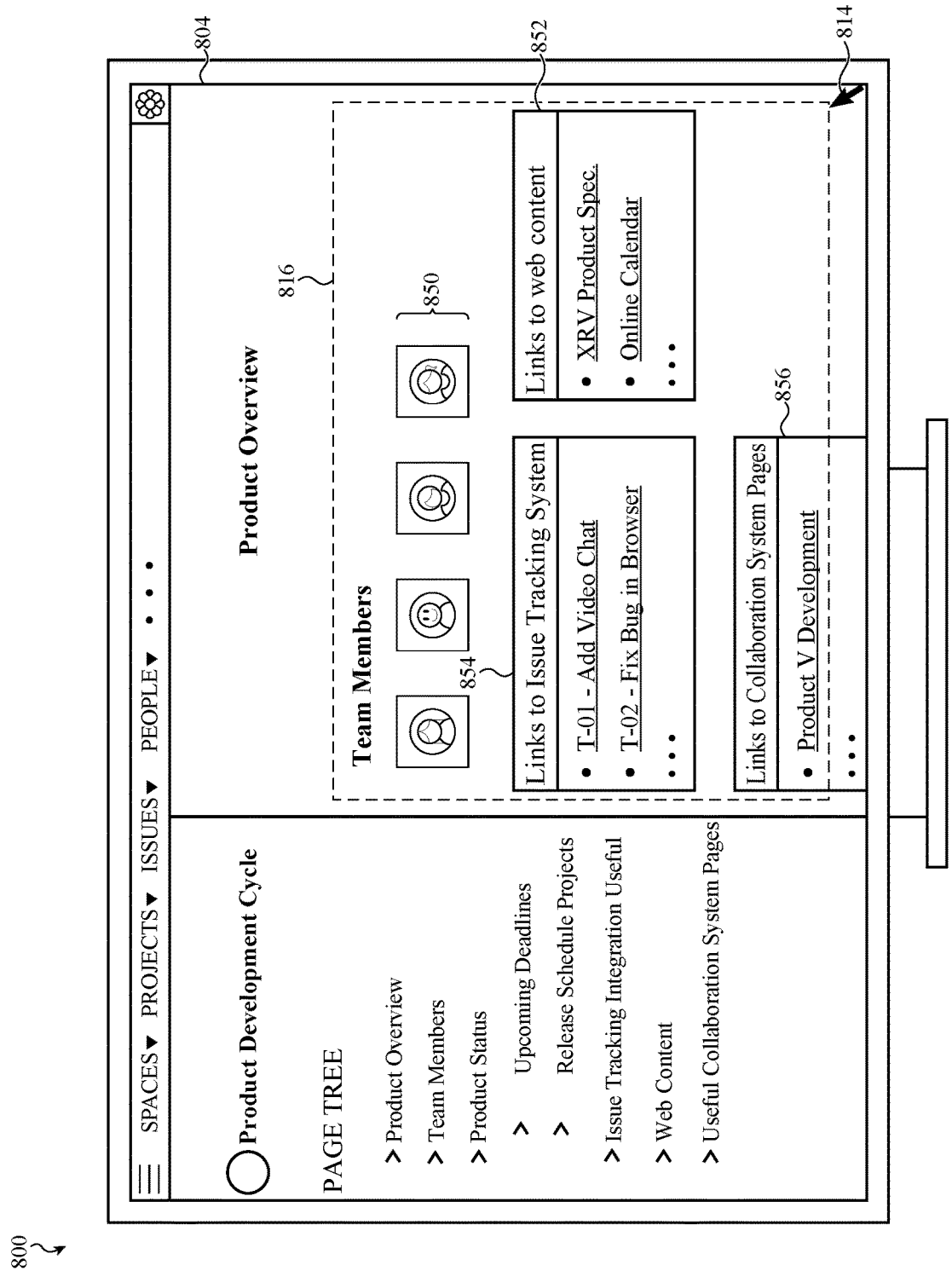
FIG. 8 depicts an example user interface of a collaboration system on which a bulk action selection may be performed on a set of objects, such as described herein.

FIG. 8 depicts another example of a graphical user interface 804 in accordance with aspects of the present disclosure. The graphical user interface 804 may be a graphical user interface of a collaboration service and may display information related to project management between groups of people. As discussed above, a input/output device may be used (e.g., via a cursor 814) to create a selection area 816. In some cases, a client interface, such as described above, may be used to create the selection area 816.

The graphical user interface 804 may include a team member group 850, an issue tracking system link area 854, a web content link area 852, and a collaboration system page link area 856. As depicted in FIG. 8, the selection area 816 may select objects within each of these groups. As the selected objects are associated with different sources (e.g., the objects are associated with different categories, an identification of a single source may not be sufficient. In such cases, multiple available bulk action menus may be provided on the graphical user interface 804, with each available bulk action menu corresponding to a different source. For example, one available bulk action menu may correspond to actions which may be taken with respect to the team member group 850 (e.g., "add a team member;" "email a team member;" and so on), a second available bulk action menu may correspond to actions which may be taken with respect to the issue tracking system link area 854 (e.g., "update a ticket status"), a third available bulk action menu may correspond to actions which may be taken with respect to the web content link area 852 (e.g., "open content in a browser"), and a fourth available bulk action menu may correspond to actions which may be taken with respect to the collaboration system page link area 856 (e.g., "integrate external page into current page"). In some cases, a single available bulk action menu may be provided and may include actions which are common across all areas (e.g., open object in a new window). It is noted that the provided examples are merely explanatory and any process in accordance with the disclosure may be used.

The foregoing embodiments depicted in FIGS. 4A-8 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof. Further, it is noted that the described objects and actions are merely explanatory and any object or action may be used in accordance with the provided disclosure.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Accordingly, one may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

I claim:

1. A system operably coupled, by a network, to a client application of a client device, the system comprising:
at least one memory configured to store instructions; and
at least one processor configured to execute the stored instructions to cause the system to:
in response to a first user selection of an area on a graphical user interface of the client application operating on the client device, select a set of objects displayed in the graphical user interface;
in response to one or more objects of the set of objects including a respective link, analyze the one or more objects to identify a particular target application of a plurality of target applications, the particular target application associated with a particular object of the one or more objects;

select a set of actions corresponding to application-specific commands associated with the particular target application;

cause display of, on the client device, an action menu displaying a set of selectable objects corresponding to the set of actions; and in response to a second user selection of a particular selectable object of the set of selectable objects, cause a particular action associated with the particular selectable object to be performed with respect to the particular object.

2. The system of claim 1, wherein:

the set of objects included in the area includes a first subset of objects associated with the particular target application and a second subset of objects associated with another target application different than the particular target application; and the particular action is not performed with respect to the second subset of objects.

3. The system of claim 1, wherein:

subsequent to causing display of the action menu displaying the set of selectable objects corresponding to the set of actions, causing display of an object selection menu;

the object selection menu including a list of selectable elements corresponding to the one or more objects; and in response to a third user selection of one or more selectable elements of the list of selectable elements of the object selection menu, cause the particular action to be performed with respect to objects corresponding to the third user selection in the object selection menu.

4. The system of claim 1, wherein:

in response to the second user selection of the particular selectable object of the set of selectable objects in the action menu, one or more mutually exclusive selectable objects are rendered unselectable.

5. The system of claim 1, wherein:

the one or more objects of the set of objects include a link to a respective issue of an issue tracking system; and the set of actions include one or more of: an update status action; an open ticket action; a close ticket action or an assign ticket action.

6. The system of claim 1, wherein:

the set of actions corresponding to the application-specific commands is a first set of actions; and the action menu includes and a second set of actions.

7. The system of claim 1, wherein the first user selection of the area is performed by a click and drag operation.

8. The system of claim 1, wherein the set of objects includes a first subset of objects associated with the particular target application and a second subset of objects associated with another target application different than the particular target application.

9. A computer-implemented method of performing a selected action on a set of objects using a graphical user interface of a client application operating on a client device, the method comprising:

causing display of the graphical user interface of the client application on the client device, the graphical user interface including a set of objects;

in response to a user input to the client application, the user input designating an area of the graphical user interface, selecting at least a subset of the set of objects;

identifying a particular target application of a set of target applications associated with one or more objects of the subset of the set of objects;

selecting at least one action corresponding to an application-specific command associated with the particular target application;

causing display of, on the client device, an action menu displaying a set of selectable objects including a particular selectable object corresponding to the selected at least one action; and in response to a user selection of the particular selectable object of the set of selectable objects, causing the application-specific command associated with the particular selectable object to be performed with respect to the particular selectable object.

10. The computer-implemented method of claim 9, wherein in accordance with the set of objects each including a respective link to a respective issue, identifying an issue tracking system as the particular target application.

11. The computer-implemented method of claim 10, wherein:

the selected at least one action includes one of: an issue assignment action; a change status action; an issue close action; or an issue open action.

12. The computer-implemented method of claim 10, wherein the selected at least one action includes downloading content corresponding to the particular selectable object from the issue tracking system or a data repository associated with the issue tracking system.

13. The computer-implemented method of claim 9, wherein:

the set of objects included in the area includes a first subset of objects associated with the particular target application and a second subset of objects not associated with the particular target application; and the application-specific command is not performed with respect to the second subset of objects.

14. The computer-implemented method of claim 9, wherein the user input designating the area of the graphical user interface comprises:

designation of an initial selection point; and a drag gesture across a region of the graphical user interface.

15. A computer-implemented method of performing a selected action on a set of objects using a graphical user interface of a client application operating on a client device, the method comprising:

in response to a first user selection of an area to the client application, selecting a set of objects displayed in the graphical user interface of the client application;

in response to at least a subset of objects of the set of objects each including a respective link, analyzing the subset of objects to identify a particular target application associated with a the subset of objects;

selecting at least one action corresponding to an application-specific command associated with the particular target application;

causing display of, on the client device, an action menu displaying a set of selectable objects corresponding to a set of actions including a particular selectable object corresponding to the selected at least one action; and in response to a second user selection of the particular selectable object of the set of selectable objects, causing the application-specific command associated with the particular selectable object to be performed with respect to the subset of objects.

16. The method of claim 15, wherein:

the set of objects included in the area includes a first subset of objects associated with the particular target application and a second subset of objects not associated with the particular target application; and the application-specific command is not performed with respect to the second subset of objects.

17. The method of claim 15, wherein:

subsequent to causing display of the action menu displaying the set of selectable objects corresponding to the set of actions, causing display of an object selection menu;

the object selection menu including a list of selectable elements corresponding to the subset of objects; and in response to a third user selection of one or more selectable elements of the list of selectable elements of the object selection menu, cause the selected at least one action to be performed with respect to objects corresponding to the third user selection in the object selection menu.

18. The method of claim 15, wherein:

each object of the subset of objects includes a link to a respective issue of an issue tracking system; and the set of actions include one or more of: an update status action; an open ticket action; a close ticket action or an assign ticket action.

19. The method of claim 15, wherein:

each object of the subset of objects includes a link to a respective document of a collaboration system; and the set of actions includes a document open action.

20. The method of claim 15, wherein the set of objects includes a first subset of objects associated with the particular target application and a second subset of objects associated with another target application different than the particular target application.

\* \* \* \* \*